United States Patent [19]

Natarajan et al.

[11] Patent Number: 5,241,542
[45] Date of Patent: Aug. 31, 1993

[54] BATTERY EFFICIENT OPERATION OF SCHEDULED ACCESS PROTOCOL

[75] Inventors: Kadathur S. Natarajan, Millwood; Chia-Chi Huang, Yorktown Heights, both of N.Y.

[73] Assignee: International Business Machines Corporation, Armonk, N.Y.

[21] Appl. No.: 749,234

[22] Filed: Aug. 23, 1991

[51] Int. Cl.$^5$ .................. H04B 7/212; H04B 7/26
[52] U.S. Cl. .................. 370/95.3; 370/85.2; 455/38.3; 455/54.1; 455/343
[58] Field of Search ............ 370/95.1, 95.3, 104.1, 370/29, 85.2, 85.7, 94.1; 455/53.1, 54.1, 343, 38.3; 340/825.44, 311.1; 379/58

[56] References Cited

U.S. PATENT DOCUMENTS

| | | | |
|---|---|---|---|
| 4,794,649 | 12/1988 | Fujiwara | 455/343 |
| 4,897,835 | 1/1990 | Gaskill et al. | 370/94.1 |
| 4,995,099 | 2/1991 | Davis | 340/825.44 |
| 5,095,308 | 3/1992 | Hewitt | 455/343 |
| 5,144,296 | 9/1992 | DeLuca et al. | 455/343 |
| 5,150,361 | 9/1992 | Wieczorek et al. | 370/95.1 |

FOREIGN PATENT DOCUMENTS 2232326 12/1990 United Kingdom .................. 370/29

OTHER PUBLICATIONS

William Stallings, "Data and Computer Communications", Macmillan Publishing Company, 1985, pp. 312–315.

Primary Examiner—Douglas W. Olms
Assistant Examiner—Hassan Kizou
Attorney, Agent, or Firm—Jack M. Arnold

[57] ABSTRACT

A method and apparatus for conserving battery power in a wireless link adapter of a battery operated computer such as a portable laptop computer, as controlled by a scheduled multiaccess protocol. The portable computer is operable as a mobile unit in a multi-cell wireless network. The scheduled access multiaccess protocol is implemented to effectively conserve battery power by suitable control of the state of the controller, the transmitter and receiver units at the wireless link adapter by scheduling when the adapter is in a normal running mode, or a standby mode in which power is conserved.

7 Claims, 9 Drawing Sheets

BATTERY EFFICIENT OPERATION OF SCHEDULED ACCESS PROTOCOL

FIELD OF THE INVENTION

The invention is in the field of wireless communications, and in particular is directed to power conservation due to wireless communication. Specifically, the invention is directed to battery efficient operation of wireless link adapters of mobile computers as controlled by multiaccess protocols used in wireless communication.

BACKGROUND OF THE INVENTION

In order to obtain true portability in micro-computers and workstations, battery powered operation is essential. Moreover, given the capacity versus size limitations of known batteries, it is essential to minimize total power consumption in order to extend the operating life of the batteries.

It is relatively easy to reduce battery consumption by an initial 60 to 70 percent in the computer portion of a mobile station. This initial savings can be accomplished by simply turning selected pieces of hardware in the computer portion off when they are not being used. The last 30 to 40 percent savings in the computer portion becomes increasingly more difficult to achieve, while simultaneously becoming increasingly more valuable in terms of extending battery life. This is due to the inverse relationship between battery life and battery load. Accordingly, savings that would seem trivial in off-line applications, might be momentous in a battery powered environment.

While the above is directed to the computer portion, to date no work has been done relative to the wireless link adapter portion of the mobile station.

There has been recent work directed to the design of multiaccess protocols for portable mobile computer users, as well as movable boundary protocols for supporting integrated voice/data users in mobile indoor radio networks. The schemes proposed to date do not take into explicit account the effective conservation of battery power used by the multiaccess scheme relative to the wireless link adapter.

Since portable laptop computers run on battery power, the implementation of a multiaccess protocol described in this invention attempts to minimize the consumption of battery power in a wireless link adapter to the minimum amount required, as a function of the protocol.

According to this invention, several techniques are disclosed for minimizing the battery power wasted at the wireless link adapters of mobile units, as controlled by a multiaccess protocol for wireless communication.

DISCLOSURE OF THE INVENTION

Method and apparatus is described for the battery efficient operation of wireless link adapters of mobile computers as controlled by scheduled multiaccess protocols for wireless communication.

DETAILED DESCRIPTION OF THE INVENTION

Figure 1:
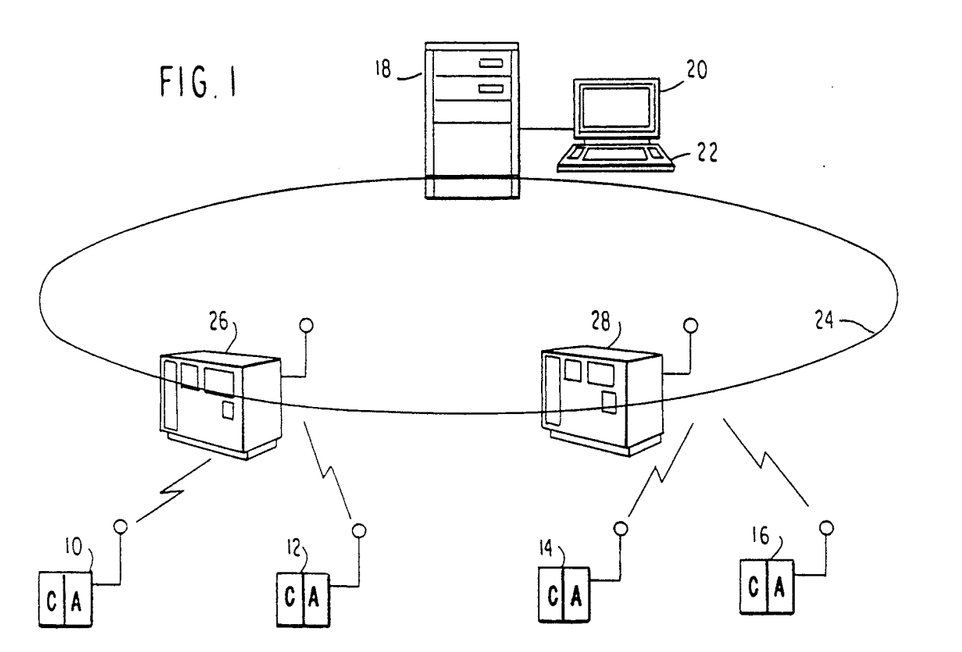
FIG. 1 is a pictorial diagram showing an indoor digital data communication system of the type in which the invention is implemented.

The invention is described relative to operation in a wireless radio communications link. It is to be appreciated that the invention is also applicable to other wireless communication links such as infrared links as well as microwave links. FIG. 1 depicts mobile stations 10, 12, 14, and 16 that communicate via wireless links. Gateways, referred to as base stations, are augmented according to the invention to provide certain radio system management functions which coordinate the mobile stations' access to the common radio channel. Communications between mobile stations is supported via relay through the base stations 26 and 28.

Figure 2:
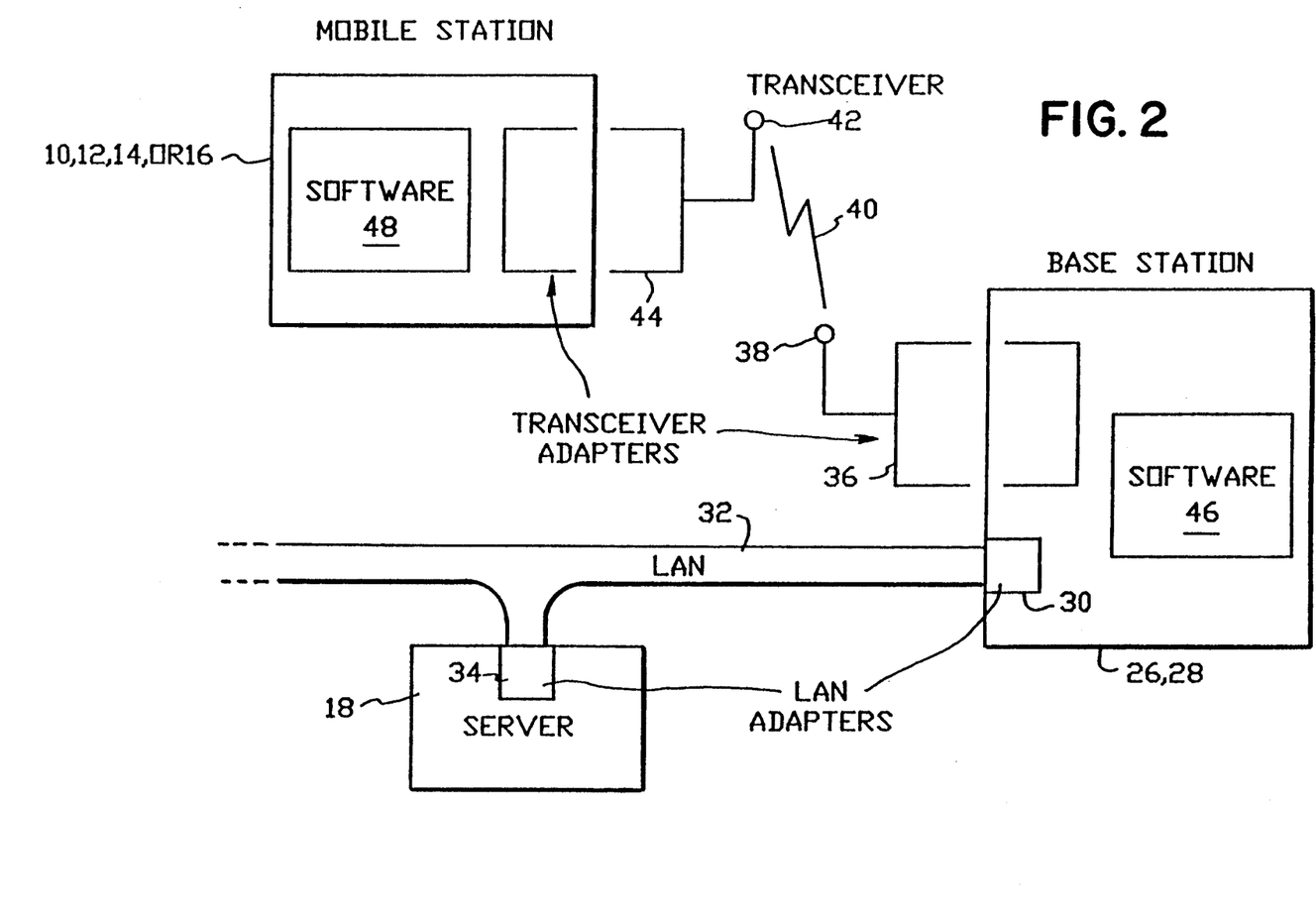
FIG. 2 is a block diagram of the system shown in FIG. 1 illustrating the basic components of a mobile station and a base station.

As shown in more detail in FIG. 2, a base station 26 or 28, which may be conventional microcomputer, has a LAN adapter 30 inserted in a bus slot and connected to LAN cabling 32. A server 18, typically also a conventional microcomputer and including one or more direct access storage devices (DASDs) such as hard disks (not shown), also has a LAN adapter 34 inserted in a bus slot and connected to LAN cabling 32. The LAN adapters 30 and 34 and the LAN cabling 32 together with LAN software constitute the LAN 24. The LAN 24 is of conventional design and does not form part of the invention. The base station 26 or 28 also has an RF transceiver adapter 36 implemented as a printed circuit card which is inserted in a bus slot of the base station. The transceiver adapter 36 includes a spread spectrum transceiver of conventional design. The transceiver adapter 36 has an antenna 38 by which a radio link 40 is established with one or more remote or mobile stations, 10, 12, 14, or 16. The mobile station may itself be a hand held or laptop computer such as an IBM PS/2 Model L40 SX laptop computer as described in Technical Reference Manual, Order Number: S/5F-2270, Part No. 15F2270, which may be ordered from an IBM Authorized Dealer.

IBM and PS/2 are registered Trademarks of International Business Machines Corporation. The laptop computer like the base station, is provided with an antenna 42 and a transceiver adapter 44, also implemented as a printed circuit card which is inserted in a bus slot of the computer. The transceiver adapter 44, like transceiver adapter 36, includes a spread spectrum transceiver of similar design. The base station and the mobile stations are further provided with software, generally indicated by reference numerals 46 and 48, respectively, which support their respective transceiver adapters.

Figure 3:
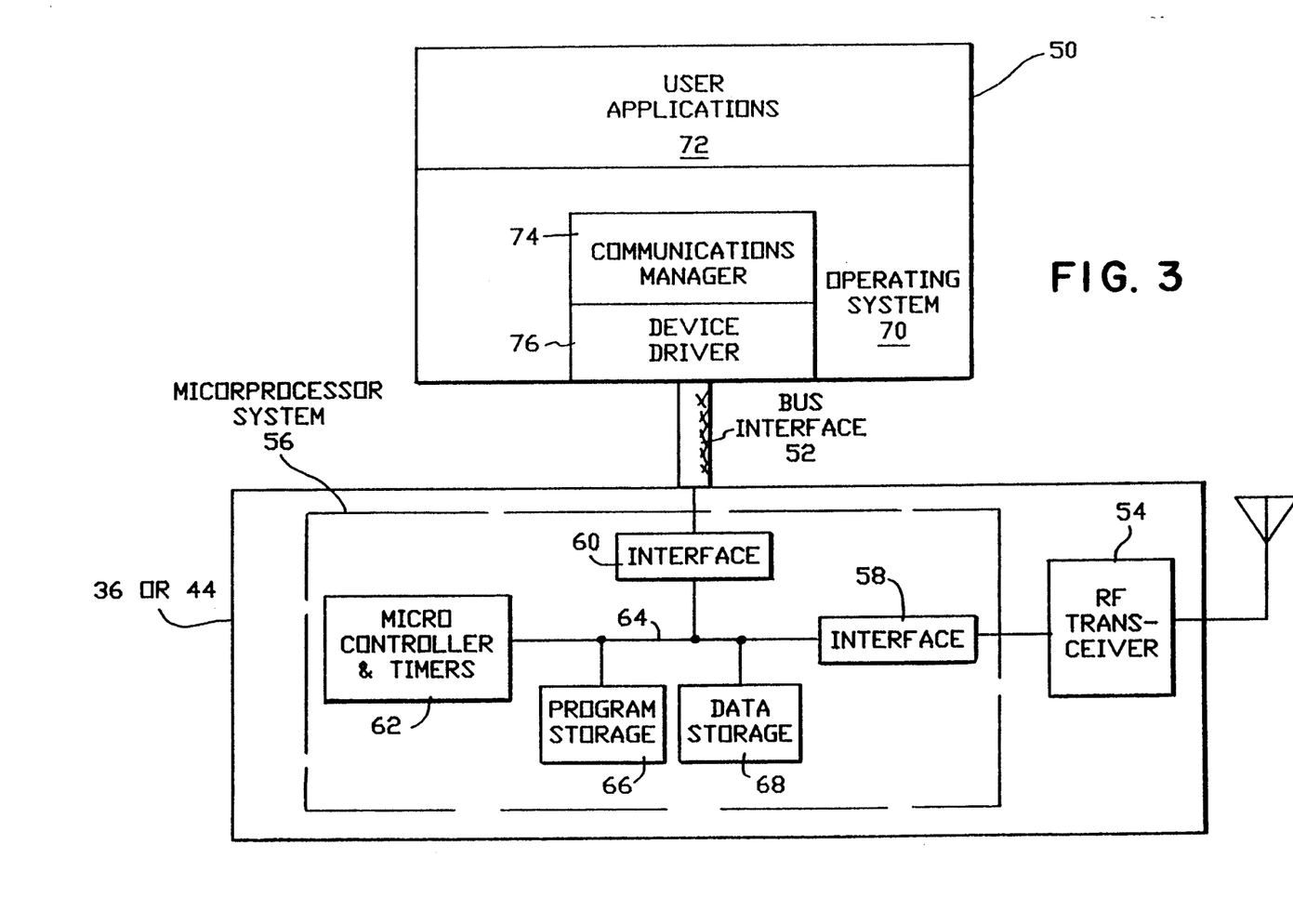
FIG. 3 is a block diagram of the radio system used in the implementation of a preferred embodiment of the invention.

FIG. 3 shows the radio system common to both the mobile stations and the base stations of FIG. 1. The radio system includes a transceiver adapter 36 or 44 connected to a computer 50 via a computer's bus interface 52. The transceiver adapter 36 section is itself divided into an RF transceiver 54, which may be commercially available spread spectrum transceiver, and a dedicated microprocessor system 56 which controls the transceiver via an interface 58. The microprocessor system 56 further includes a system interface 60 which interfaces the transceiver adapter 36 section to the computer section 50. The microprocessor system includes a dedicated microprocessor 62 containing high-resolution time interval determination hardware or "timers" typical of real-time microprocessor systems.

Microprocessor 62 is connected by a memory bus 64 to program storage 66 and data storage 68 as well as to interfaces 60 and 58 providing attachment to bus interface 52 and RF transceiver 54, respectively. Program storage 66 is typically read only memory (ROM), while data storage 68 is static or dynamic random access memory (SRAM or DRAM). Packets received or to be sent are held in data storage 68 and communicated to or from the RF transceiver 54 via interface 58 under control of serial channels and a direct memory access (DMA) controller (not shown) which is part of the microprocessor 62. The function of these serial channels is to encapsulate data and control information in an HDLC (high-level data link control) packet structure and provide the packet in serial form to the RF transceiver 54. For more information on the HDLC packet structure, see, for example, Mischa Schwartz, Telecommunication Networks: Protocols, Modeling and Analysis, Addison-Wesley (1988).

When a packet is received through the RF transceiver 54, the serial channels check the packet destination address, check for errors, and deserialize the packet to data storage 68. The serial channels must have the capability to recognize a specific adaptor address as well as a broadcast address. Specific microprocessors with appropriate serial channel and timer facilities include the Motorola 68302 and the National Semiconductor HPC46400E microprocessors.

The computer 50 runs an operating system 70 which supports one or more user application programs 72. The operating system 70 may include a communications manager 74, or the communications manager 74 may itself be an application program installed on the computer. In either case, the communications manager 74 controls a device driver 76 via the operating system 70. The device driver 76, in turn, communicates with the transceiver adapter 36 or 44 via bus interface 52.

In general, the main idea for minimizing battery power consumed by wireless link adapters at the mobile units is as follows. The transmitter and receiver units at the communication adapter(s) of a portable terminal expend some power that depend on their states (OFF state/ON state/ACTIVE ON). The ratio of transmit-to-receive power depends also on the type of wireless link adapter used (radio or infrared). Scheduled access multiaccess protocols can be implemented to effectively conserve battery power by suitable control of the state of transmitter and receiver units at the portable units (i.e., by scheduling when they should be turned ON or OFF). A desirable solution is one in which the transmitter (or receiver) consumes power only when it is actively transmitting a message (or actively receiving a message). Traditional multiaccess protocols do not have the above desirable characteristics because:

A receiver may consume power while waiting to receive a packet. Some examples are as follows:
  A mobile station may be waiting to hear a polling message from the base station station before it can transmit a packet.
  Outbound messages are broadcast from the base station. Mobiles keep their receiver ON in order to receive packets that may be addressed to them. Battery power is wasted in receiving packets that are addressed to others.
A transmitter may consume power while waiting to transmit a packet.

Figure 4:
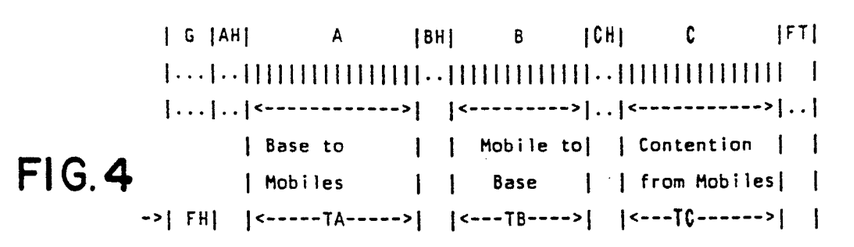
FIG. 4 is a diagram of the frame structure of a multiaccess protocol for describing the battery efficient operation of a wireless link adapter according to the invention.

In the scheme described here, a scheduled multiaccess protocol is used in which time is divided into fixed-length frames, and frames are divided into slots as shown in FIG. 4. It is to be appreciated that different frame divisions and header lengths and content may be utilized in the practice of the invention, and the scheme set forth here is merely exemplary.

The beginning of the frame is a header G of fixed length FH. The frame is divided into multiple subframes as described below.
  Period A for broadcast of packets from base station to mobile units (outbound traffic), with a header AH for period A.
  Period B for the contention-free transfer of all traffic from mobile units to base station (inbound traffic), with a header BH for period B.
  Period C for the transfer of all bursty data traffic in a contention mode from mobile units to base station (inbound traffic), with a header CH.

Referring to FIG. 1, in conjunction with FIG. 4, in interval A the base station 26 or 28 controls the transmissions outbound to the mobile units 14. The corresponding header (AH) control information for this interval is broadcast reliably by the base station, and is assumed to be received correctly by relevant mobile stations. The header includes:
  A list of mobile users ($U_1, U_2, \ldots, U_n$), that will be receiving data from the base station in the current frame and the order in which they will receive packets.
  Bandwidth allocated to users in this frame ($S_1, S_2, \ldots, S_n$), where $S_i$, is the number of packets that will be directed to User $U_i$ from the base station in the current frame.

In the description that follows, a transmitter or receiver is considered ON or awake when it is in a normal running mode. A transmitter or receiver is considered OFF or asleep when it is in an idle or standby mode.

The following is a general description of the method of battery efficient control of a wireless link adapter as controlled by a scheduled multiaccess protocol for wireless communication as shown in FIG. 4, a more detailed description is set forth relative to FIGS. 8A-8D. On correct reception of the above broadcast information as shown in FIG. 4, a mobile unit that is not included in Header AH can turn its receiver OFF for a time duration TA (total number of slots allocated to interval A). The adapter of each receiving mobile unit can compute exactly when it should be ready to receive packets from the base station (add up the slots allocated to all receiving units that precede it). Each receiving mobile unit goes to sleep after scheduling to wake itself up at its designated time for receiving data. After receiving its packets, the mobile unit goes to sleep for the remainder of period A. At the end of the A interval, all mobile units turn their receiver ON and receive Header BH corresponding to the B interval.

Header BH contains an ordered list of users that will be allowed to transmit to the base station in the current frame.

- A list of mobile stations ($V_1, V_2, \ldots, V_n$) that are allowed to transmit packets to the base station in the current frame and the order in which they should transmit.
- Bandwidth allocated to mobile stations in this frame ($t_1, t_2, \ldots, t_n$), where $t_i$ is the number of packets that the mobile station $V_i$ can transmit in the current frame.

Using the information regarding the number of packets that each user can transmit, each mobile unit can compute exactly when it should begin its transmission. Once each mobile station computes its exact time for transmission, it can schedule to wake up its transmitter at its designated time and then go to sleep (i.e., shut both it s transmitter and receiver OFF). At its designated time, the transmitter at a mobile station can turn ON and transmit for a fixed period of time whose duration depends on the number of slots allocated to it.

It is pointed out that explicit polling messages are not used to address users individually. The advantage of avoiding explicit polling on a peruser basis is the following. Each polling message spacing incurs a fixed overhead time per station that is polled. The overhead is independent of whether the station has anything to transmit or not. The polling overhead is the sum of the following components:

Time to transmit a polling message.

Effective propagation time for the polling message (this includes the delay due electromagnetic radiation plus the radio turnaround time from receive-to-transmit mode at the mobile unit that responds to a poll message and radio turnaround time at the base station itself) could significantly impair performance in radio-based networks.

The execution of scheduled access in the manner described here has the following advantages over explicit polling schemes. They are summarized below:

Effective elimination of the polling overhead for all inbound traffic from mobile users.

More importantly, the mobile stations economize the use of battery power by utilizing the control information contained in the AH (Outbound) and BH (Inbound) headers and scheduling their transmitters/receivers to be turned ON just in time and turned OFF at the earliest opportunity.

In interval C (Random Access or Contention Mode), only those mobile units that do not wish to transmit go to sleep (by turning both their transmitter and receiver OFF) till the end of the current frame. The inbound traffic from remaining mobile units may include: registration requests (that enable mobile stations to request the services of the base station), bandwidth reservation requests for use in interval B, single packet messages etc. A mobile unit executing a random access protocol wakes up its transmitter at its designated time and transmits and then goes to sleep. The receiver at the mobile unit can wake itself up to receive acknowledgement messages at the correct time and then go to sleep. It is likely that battery power savings resulting from efficient operation of interval C may be significantly less compared to those realized in the contention-free intervals A and B.

Next a brief outline of a scheme for implementing battery efficient execution of a simple version of the Scheduled Access Protocol for wireless communication is described. The implementation is based on the concept of broadcasting short user activity (in transmit and receive modes) indexing messages in the header sections of a frame. For purpose of description, assume that in each frame a mobile unit is allocated at least one slot for receiving traffic and at least one slot for transmitting traffic.

In Period A, before the base station broadcasts messages to receivers, it includes a Receiving Users Index in the Header AH section of the frame. The Receiving Users Index is a coded description of mobile users that will receive data in the current frame. That is, it is a designation of which mobile users are to communicate with the base station during this frame. All the mobiles listen to this designation or indexing message and all Receive-Inactive users (i.e., users who do not have a message coming in from the base station in the current frame) can simply turn their receiver power OFF until the beginning of Header BH for Period B. At that time all the mobiles turn their receivers ON and listen to Transmitting Users Index in the Header BH section of the frame. The receivers are turned OFF until the beginning of Header CH for Period C. The Transmitting Users Index is a coded designation or description of mobile users that can transmit data in the current frame. Transmit-Inactive users (i.e., users who do not have a slot designated or allocated to them for transmission) can simply continue to keep their transmitters powered OFF until the beginning of Header CH for Period C.

Significant power savings can be achieved due to the following two observations:

Most users are very likely to be inactive (both Transmit-Inactive and Receive-Inactive) most of the time for most applications. This is primarily due to the bursty nature of data communication traffic.

The designation or indexing messages in the header sections (AH and BH) represent a small fraction of the whole frame length.

A method of implementation of the multiaccess protocol is described below. Here, assume that there are N users in the system, say, N=64. Then the users can be indexed from 1 to 64 by the base station in each user's initial registration period. The registration is needed to associate each mobile unit in the network with the intended base station.

Figure 5:
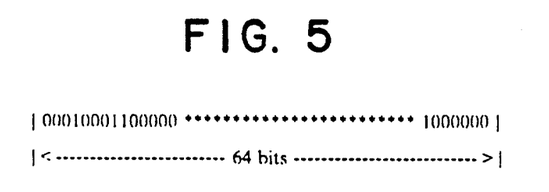
FIG. 5 is a diagram of a Receiving Users Index message as a bit-vector 64 bits long.

In the initial portion of the header section AH, the base station sends out the Receiving Users designation or Index message portion of the header as a bit-vector, 64 bits long as shown in FIG. 5.

The content of each bit location signals the receiver activity of the user designated or indexed by the bit location. For example, reading left to right, a "1" in the 4'th, 8'th, 9'th, etc. bit location can be used to signal that the 4'th, 8'th, 9'th, etc. mobile unit is designated to receive one message in the current frame period. "0" in the 1'st, 2'nd, 3'rd, etc. bit location signals that the 1'th, 2'nd, 3'rd, etc. mobile unit is inactive (is not designated to receive any data) and can turn its receiver power OFF until the beginning of Header BH.

Optimization of transmit power is done in an analogous manner. In the initial portion of the Header BH, the base station sends out another 64 bit-vector representing the Transmitting Users designation or Index. Mobile user i turns its transmitter ON only if the $i^{th}$ bit in the bit-vector is 1.

The methods described above are simple and effective in reducing power consumption in any frame based Scheduled Access Protocol scheme for sharing wireless communications channels (radio and infrared) among portable mobile users. The techniques for battery efficient operation of the protocol rely on implementation of timers that do not consume significant battery power when compared with transmitter, receiver, microprocessor or logic in the wireless adapter cards. A detailed description of an exemplary wireless link adapter is set forth shortly relative to FIG. 9. The adapter described, utilizes the components described below. The following data taken from manufacturer's manuals indicate that timers can be implemented with relatively low power consumption. The example is representative of what can be saved in a realistic system. As an example, a HPC microcontroller 46400E consumes 385 mW in Normal running mode and 55 mW in Idle mode (i.e, with internal timer and oscillator running). The Proxim transceiver (RDA-100/2) consumes 325 mW in Transmitter ON mode, 400 mW in Receiver ON mode and 1 mW in Standby mode. When the timer is used to put the transmitter and receiver into sleep mode, the HPC microcontroller can be put into Idle mode (55 mW) and the Proxim radio can be put in Standby mode (1 mW). Thus the minimum power consumed is 56 mW in sleep mode. When the transmitter is ON, the power consumed is the sum of HPC running in normal mode (385 mW) and the transmitter in ON mode (325 mW). Similarly, when the receiver is ON, the power consumed is the sum of HPC running in normal mode (385 mW) and the receiver in ON mode (400 mW).

Suppose $f_t$ is the fraction of the time a user is actively transmitting (i.e., user is allocated $(TA+TB) f_t$ slots in Period B) packets to the base station. Suppose $f_r$, is the fraction of the time the user is actively receiving packets addressed to him (i.e., user is allocated $(TA+TB) f_r$ slots in Period A). The power consumed using the current invention is:

$$(385+325)f_t+(385+400)f_r+(55+1)$$
$$(1-f_t-f_r)=710f_t+785f_r+56(1-f_t-f_r) \text{ mW}$$

The power consumed without the techniques of this invention is:

$$400(1-f_t)+325f_t+385=(785-75f_t) \text{ mW}$$

If $f_t=0.1$, $f_r=0.1$ power consumption with this invention is 194.3 mW. Otherwise the power consumed would have been 777.5 mW. Significant power savings can be realized with this invention, especially as $f_t\rightarrow 0$, $f_r\rightarrow 0$.

Figure 6:
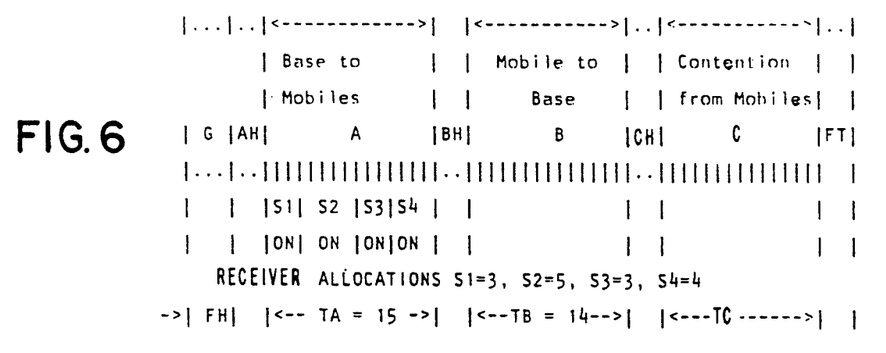
FIG. 6 is a diagram of receiver allocations for the multiaccess protocol.

FIG. 6 is a diagram of receiver allocation of the multiaccess protocol. If there are 64 mobile units as shown in FIG. 5, four (4) of these units are designated to receive information from the base station. It is seen that there are 15 slots allocated, 3 in time period S1 for the first unit, 5 in time period S2 for the second unit, 3 in time period S3 for the third unit, and 4 in time period S5 for the fourth unit.

Figure 7:
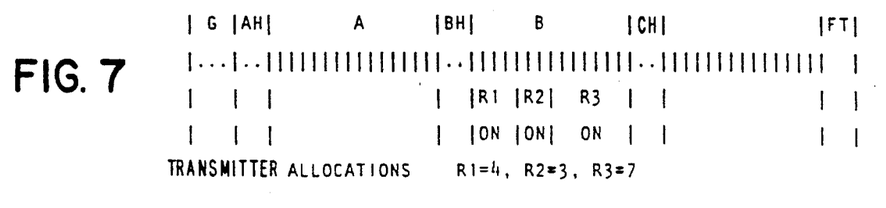
FIG. 7 is a diagram of transmitter allocations for the multiaccess protocol.

FIG. 7 is a diagram of transmitter allocations for the multiaccess protocol. Three mobile units are designated to transmit information to the base station. It is seen that there are 14 slots allocated, 4 in time period R1 for the first unit, 3 in time period R2 for the second unit and 7 in time period R3 for the third unit.

Figures 8, 8A:
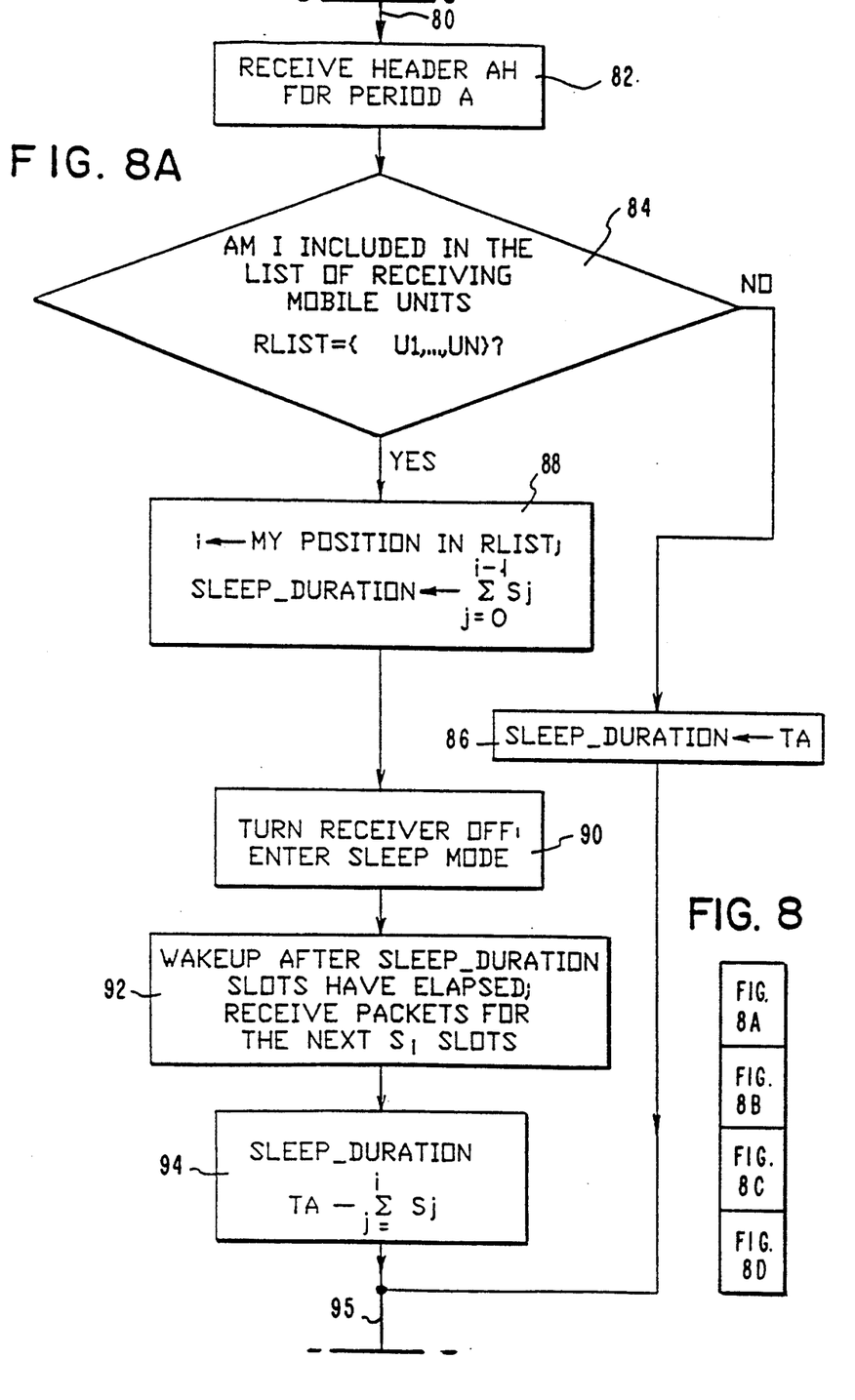
FIG. 8A-8D, when taken together as shown in FIG. 8, are block diagram representations of how the battery efficient operation of the wireless link adapter is controlled by the multiaccess protocol, as implemented according to the invention.
Figure 8B:
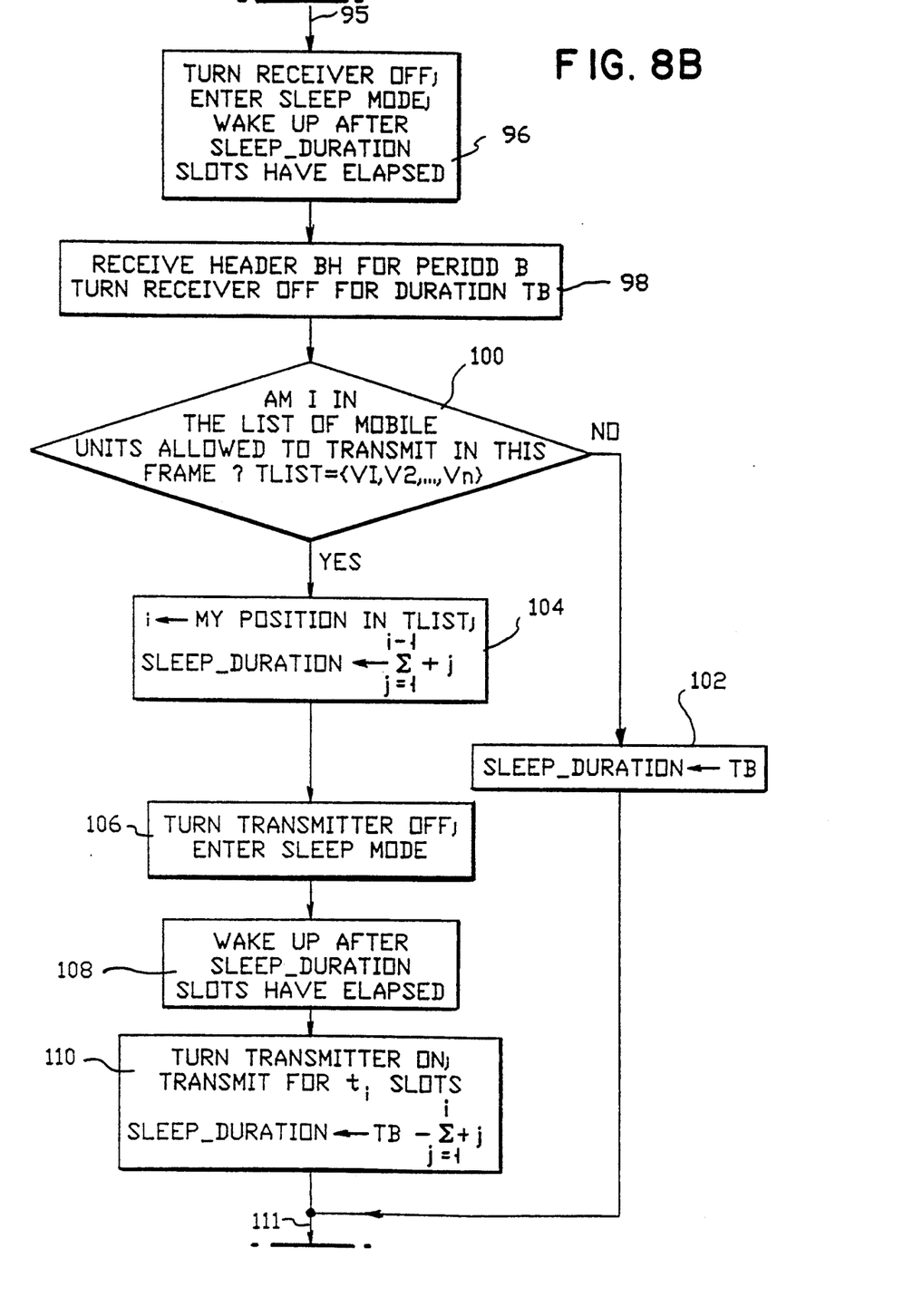
Figure 8C:
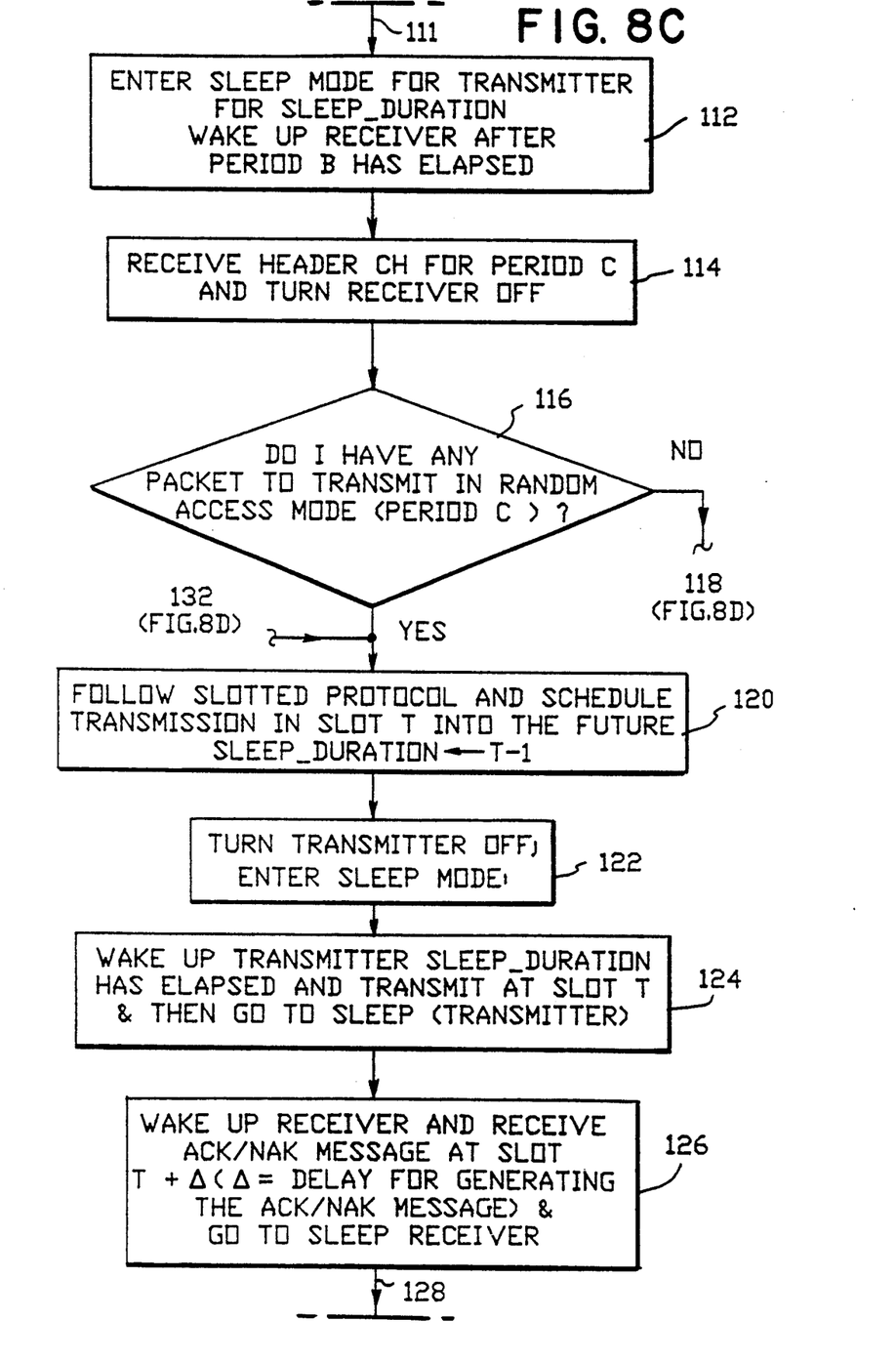
Figure 8D:
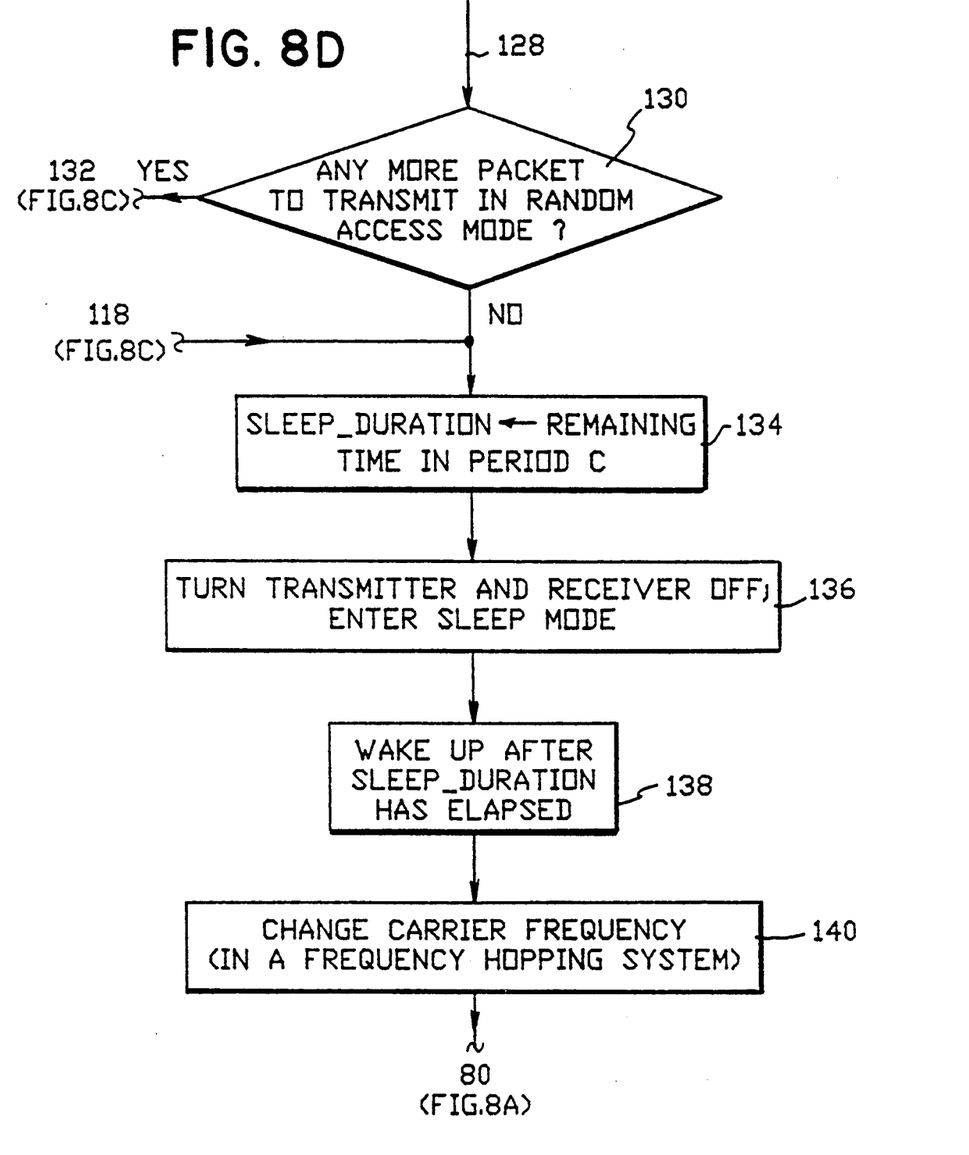
Figure 9:
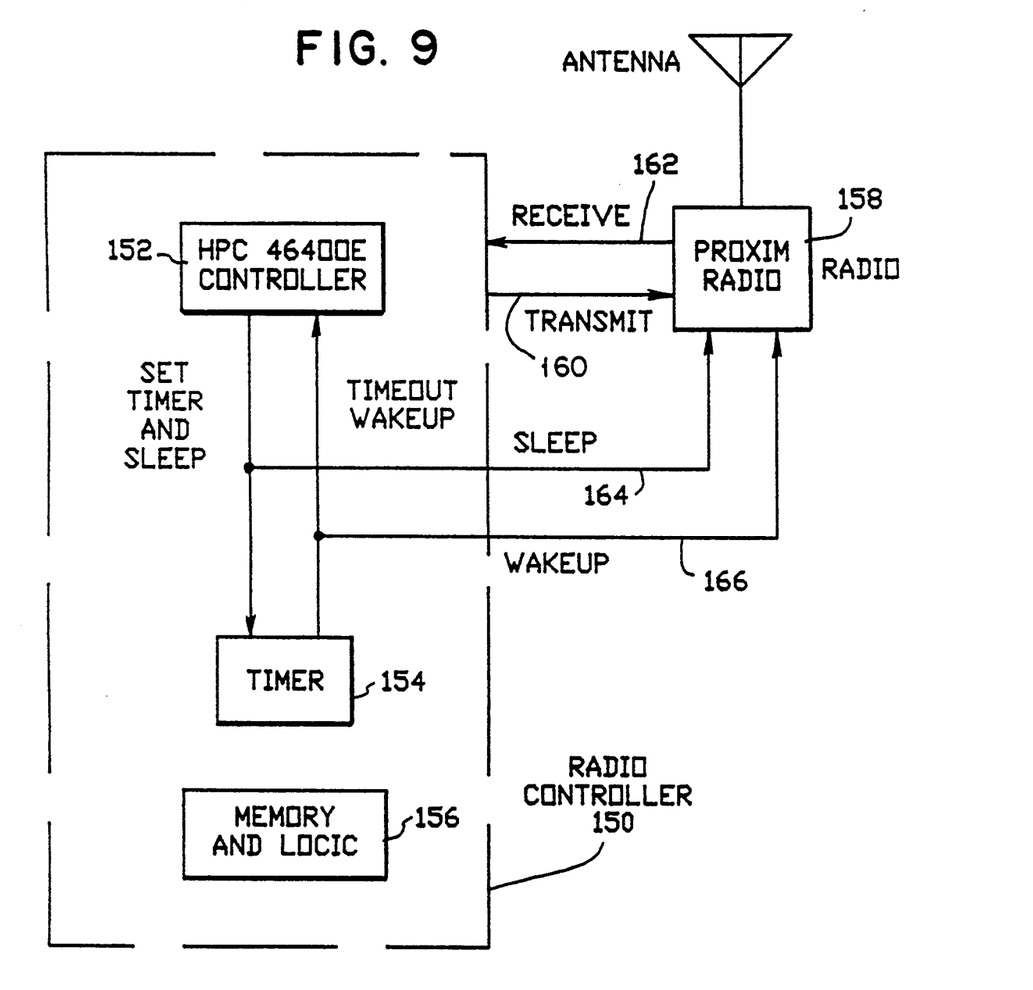
FIG. 9 is a block diagram of how a controller in the wireless link adapter sets a time to accomplish the implementation set forth in FIGS. 8A-8D.

Refer now to FIGS. 8A–8D which constitute a flow chart of a program operable in controller 152 of the wireless link adapter of FIG. 9 for controlling the battery efficient operation of a wireless link adapter as controlled by the multiaccess protocol as illustrated in FIGS. 4, 6 and 7. In the following description, it is to be appreciated that any reference to a transmitter or receiver, is to the transmitter or receiver of the wireless link adapter.

In FIG. 8A at input 80 the header AH (FIG. 4) is received for period A at block 82. At decision block 84 a determination is made by a given mobile unit, such as unit 10 (FIG. 1) if it is designated in the RLIST of receiving mobile units (FIG. 5). If the determination NO is indicated, at block 86 the adapter of the given mobile station 10 sets the variable sleep duration (indicates how long it can sleep) to TA. At block 86, the receiver is turned off for the duration TA (FIG. 4) of the broadcast of the base station such as base station 26 to the given mobile station 10, resulting in a conservation of power at the mobile station 10 for the period TA. If the determination at block 84 is YES that the given mobile station 10 is designated in the RLIST, a determination is made at block 88 what the position of the given mobile station is in the RLIST. User ui must wait until all preceding users (U1, U2, ..., $U_{i-1}$ have received their packets. The length of the wait equals the sum of receiver slot allocations as computed at block 88. The receiver of the mobile station 10 is turned OFF at block 90, and turned back ON at block 92 when the time slots allocated in the RLIST for the mobile station 10 is reached. After receiving the packets addressed to it, mobile station 10 at block 94 computes the remaining time in period A that it should sleep.

The sleep duration as computed in blocks 86 and 94 is provided at point 95 to block 96 of FIG. 8B. The receiver for the mobile station is once again turned off as indicated at block 96 after its allotted time slots have passed. Since the receiver for the mobile station 10 is on only during allotted time slots, once again battery conservation during the receive mode has been achieved.

During the transmission cycle for mobile unit to base station transmission, the header BH (FIGS. 4,6 and 7) for period B is received by the given mobile station 10 at block 98, as previously explained, and the receiver is turned off for entire duration of period B. A determination is then made at decision block 100 whether or not the given mobile station is designated to transmit in this frame. If the determination is NO, the adapter of the given mobile station 10 sets variable sleep-duration (indicates how long the transmitter is off) to TB, as indicated at block 102. The transmitter of the mobile station 10 is turned off at block 102 (FIG. 8C) for the duration TB of the period B (FIG. 4), resulting in a conservation of power at the mobile station 10 for the period TB. If the determination at block 100 is YES that the given mobile station 10 is designated in the TLIST a determination is made at block 104 what the position of the given mobile station is in the TLIST. User Vi must wait until all preceding users $V_1, V_2, \ldots, V_{i-1}$ have transmitted their packets in their allocated slots. The length of the wait equals the sum of transmitter slot allocations as computed in block 104. The transmitter of the mobile station 10 is turned off at block 106, and turned back on at block 108 when the time slots allocated in the TLIST for the given mobile station 10 is reached. After transmitting its packets, mobile station 10 computes at block 110 the remaining length of period B.

The sleep duration as computed in blocks 102 and 110 is provided at point 111 to block 112 of FIG. 8C. The transmitter for the given mobile station 10 is once again turned off as indicated at block 112 after its allotted time slots have passed. Since the transmitter for the mobile station 10 is on only during its allotted time slots, once again battery conservation during the transmit mode has been achieved.

During the contention cycles for mobile stations relative to transmission to the base station station, the header CH for period TC (FIGS. 4,6 and 7) is received by the given mobile station 10 at block 114 and the receiver is turned off for the duration of perion C. A determination is made at decision block 116 whether or not the given mobile station 10 has any packets to transmit in the random access mode (period C). If the answer is NO as indicated at point 118 proceed to block 134 of FIG. 8D. The function of the block 134 is explained shortly. If the determination at block 116 is YES, proceed to block 120 where transmission is scheduled in a slot T. The transmitter is turned off for the times other than the slot T, as indicated at block 122. The transmitter is then turned on at slot T as indicated at block 124. The receiver is turned on at block 126 to receive a ACK/NAK message at slot T+Δ from the base station. The Δ is equal to a delay sufficient for the base station to send, and the mobile station to receive the ACK/NAK message. If a NAK message is received, packet is rescheduled for repeat transmission. The receiver is then put back to sleep.

The indication of the receiver being turned off at point 128 is provided to decision block 130 of FIG. 8D, where a determination is made if there are any more packets to transmit in the random access mode. If the determination is YES, as indicated at point 132, the logic returns to block 120 of FIG. 8C to proceed as previously explained. If the determination is NO, the sleep duration is set to the remaining length of period C, and the battery power for the transmitter and receiver are turned off for the remaining duration of the period C. Accordingly, the transmitter and receiver are turned off at block 136. The receiver is turned back on at block 138 after period C has elapsed. If this is a frequency hopping system, the carrier frequency is changed at block 140 and a return is made via point 80 to block 82 of FIG. 8A to repeat the transmission of the multiaccess protocol from the base station 26 to the mobile station 10.

FIG. 9 is an exemplary block diagram of wireless link adapter hardware which may be used to implement battery power control of the adapter in accord with the flow charts of FIGS. 8A-8D. The components used in the adapter and the power consumption characteristics were described earlier. A radio controller 150 includes a HPC controller 152, a timer 154 and memory and logic 156 for controlling the battery efficient operation of a Proxim radio transmitter/receiver 158. That is, controlling the normal running mode and idle mode of the radio transmitter/receiver 158 as controlled by the scheduled multiaccess protocol. Transmit and receive signals are via lines 160 and 162 respectively. Sleep and wakeup signals are via lines 164 and 166 respectively.

The controller 152 sets the timer 154 for desired periods of time as explained relative to FIGS. 8A-8D. When the timer 154 elapses, it sends a wakeup signal to the controller 152, and to the radio 158 via line 166. The radio receiver 158 is put to sleep by the controller 152 via the line 164.

In summary, a method has been set forth for the battery efficient operation of a wireless link adapter of a mobile computer as controlled by a scheduled multiaccess protocol.

Industrial Applicability

It is an object of the invention to provide a method and apparatus for conserving battery power in a wireless link adapter of a mobile computer.

It is another object of the invention to provide a method and apparatus for conserving battery power in a wireless link adapter of mobile computers as controlled by a multiaccess protocol for wireless communication between the mobile computers and a base station.

It is yet another object of the invention to provide a method and apparatus for conserving battery power in a wireless link adapter of mobile computers as controlled by a multiaccess protocol for wireless communication between the mobile computers and a base station. The multiaccess protocol is portioned into at least one frame which is divided into slots, with there being at least one slot assigned to each mobile computer designated to communicate with the base station. The battery power of the wireless link adapter for a given mobile computer designated to communicate with the base station is turned on to full power at least during said at least one slot, for running the given mobile computer in a normal running mode, with the battery power of the wireless link adapter being substantially reduced during the remaining time slots, for running the given mobile computer in an idle mode.

Having thus described our invention, what we claim as new, and desire to secure by Letters Patent is:

1. A method of conserving battery power in a wireless link adapter of battery powered computers operable in a multiaccess protocol for wireless communication between n, where n is an integer, of said battery powered computers and a base station, with said protocol including a designation of which ones of said n computers are to communicate with said base station, said method comprising the steps of:

partitioning said multiaccess protocol into at least one frame including a header AH having n bits, with each of said n bits being assigned to a corresponding one of said n battery powered computers, with a given one of said n computers being scheduled for communication with said base station during said frame when its corresponding one of said n bits is in a first state, and for not being in communication when in a second state, with the remainder of said frame being divided into a plurality of slots in a time duration TA, with there being at least one slot dynamically assigned to only the ones of said n battery powered computers scheduled to communicate with said base station;

turning ON said battery power of said wireless link adapter for each of said n battery powered computers for the duration of header AH;

turning OFF battery power for said time duration TA for each wireless link adapter of the n battery powered computers that is not scheduled to communicate with said base station; and turning ON battery power only during the at least one slot time of TA scheduled, for each wireless link adapter of the n battery powered computers scheduled to communicate with said base station, and turning OFF battery power for the remaining slots of TA.

2. The method claimed in claim 1, wherein the communication scheduled is for said base station to transmit to the scheduled ones of said battery powered computers during the time duration TA.

3. The method of claim 2, including the steps of:
including a second frame in said multiaccess protocol, including a header BH having n bits, with each of said n bits being assigned to a corresponding one of said n battery powered computers, with a given one of said n computers being scheduled for transmitting information to said base station during said second frame when its corresponding one of said n bits is in a first state, and for not transmitting information when in a second state, with the remainder of said second frame being divided into a plurality of slots in a time duration TB, with there being at least one slot dynamically assigned to only the ones of said n battery powered computers scheduled to transmit to said base station;
turning on said battery power of said wireless link adapter for each of said n battery powered computers for the duration of the header BH;
turning OFF battery power for said time duration TB for each wireless link adapter of the n battery powered computers that is not scheduled to transmit to said base station; and
turning ON battery power only during the at least one slot time of TB scheduled for each wireless link adapter of the n battery powered computers scheduled to transmit to said base station, and turning OFF battery power for the remaining slots of TB.

4. The method of claim 3, including the steps of:
including a third frame in said multiaccess protocol, with said third frame including a header CH which includes a designation of the number of slots available in the remainder of said third frame in time duration TC, with said third frame being allotted to contention mode transmission from said n battery powered computers to said base station;
turning ON said battery power of said wireless link adapter of each of said n battery powered computers for the duration of the header CH;
turning OFF said battery power of the receiver of each wireless link adapter of each of said n battery power computers for the time duration TC;
turning OFF the battery power of the transmitter in said wireless link adapter of any of said battery powered computers that do not wish to transmit to said base station during said third frame; and turning ON said battery power for a transmitter of said wireless link adapter in a given battery powered computer for at least one slot in said third frame for transmitting from said given battery powered computer to said base station, with said battery power for said transmitter of said wireless adapter link being turned OFF for the remaining time slots of said third frame.

5. A method of conserving battery power in a wireless link adapter of battery powered computers operable in a multiaccess protocol for wireless communication between n, where n is an integer, of said battery powered computers and a base station, with said protocol including a designation of which ones of said computer are to communicate with said base station, said method comprising the steps of:
partitioning said multiaccess protocol into at least one frame including a header AH having n bits, with each of said n bits being assigned to a corresponding one of said n battery powered computers, with a given one of said n battery powered computers being scheduled for communication with said base station during said at least one frame, when its corresponding one of said n bits is in a first state, and for not being in communication when in a second state, with the remainder of said at least one frame being divided into a plurality of slots in a time duration TA, with there being at least one slot dynamically assigned to only the ones of said n computers scheduled to communicate with said base station;
running said wireless link adapter of each of said n battery powered computers in a normal running mode for the duration of header AH;
running in an idle mode for said time duration TA, said wireless link adapter of each of the n battery powered computers that is not scheduled to communicate with said base station; and
running said wireless link adapter in a normal mode only during the at least one slot time of TA scheduled for each of the n battery powered computers that is scheduled to communicate with said base station, and running it in an idle mode for the remaining slots of TA.

6. A method of conserving battery power in a wireless link adapter of battery powered computers operable in a multiaccess protocol for wireless communication between n, where n is an integer, of said battery powered computers and a base station, with said protocol including a designation of which ones of said n computers are to communicate with said base station, said method comprising the steps of:
partitioning said multiaccess protocol into at least first and second frames;
including in said first frame a header AH having n bits, with each of said n bits being assigned to a corresponding one of said n battery powered computers, with a given one of said n computers being scheduled for receiving information from said base station during said first frame when its corresponding one of said n bits is in a first state, and for not receiving information when in a second state, with the remainder of said frame being divided into a plurality of slots in a time duration TA, with there being at least one slot dynamically assigned to only the ones of said n battery powered computers scheduled to receive information from said base station;
running said wireless link adapter for each of said n battery powered computers in a normal running mode for the duration of header AH;
running said wireless link adapter in an idle mode for said time duration TA for each of the n battery powered computers that is not scheduled to receive information from said base station;
running said wireless link adapter in a normal running mode only during the at least one slot time of TA scheduled for each of the n battery powered computers scheduled to receive information from said base station;

including in said second frame a header BH having n bits, with each of said n bits being assigned to a corresponding one of said n battery powered computers, with a given one of said n computers being scheduled for transmitting information to said base station during said second frame when its corresponding one of said n bits is in a first state, and for not transmitting information when in a second state, with the remainder of said second frame being divided into a plurality of slots in a time duration TB, with there being at least one slot dynamically assigned to only the ones of said n battery powered computers scheduled to transmit to said base station;

running said wireless link adapter for each of said n battery powered computers in a normal running mode for the duration of the header BH;

running said wireless link adapter in an idle mode for said time duration TB for each of the n battery powered computers that is not scheduled to transmit to said base station; and running said wireless link adapter in a normal running mode only during the at least one slot time of TB scheduled for each of the n battery powered computers scheduled to transmit to said base station, and running it in an idle mode for the remaining slots of TB.

7. The method of claim 6, including the step of:

including a third frame in said multiaccess protocol, with said third frame including a header CH which includes a designation of the number of slots available in the remainder of said third frame in a time duration TC, with said third frame being allotted to contention mode transmission from said n battery powered computers to said base station;

running in the normal running mode the receiver in the wireless link adapter of each of said n battery powered computers for the duration of the header HC;

running in the idle mode the transmitter in said wireless link adapter of any of said n battery powered computers that do not wish to transmit to said base station during said third frame; and running the transmitter in said wireless link adapter in a given one of said n battery powered computers in a normal running mode at least during one slot in said third frame for transmitting communications from said given one of said n battery powered computer to said base station, with said transmitter in said wireless link adapter running in an idle mode for the remaining time slots of said third frame.

* * * * *